July 23, 1968     W. A. ZUMBIEL     3,393,884
AIRCRAFT SAFETY SYSTEM
Filed May 5, 1967     2 Sheets-Sheet 1
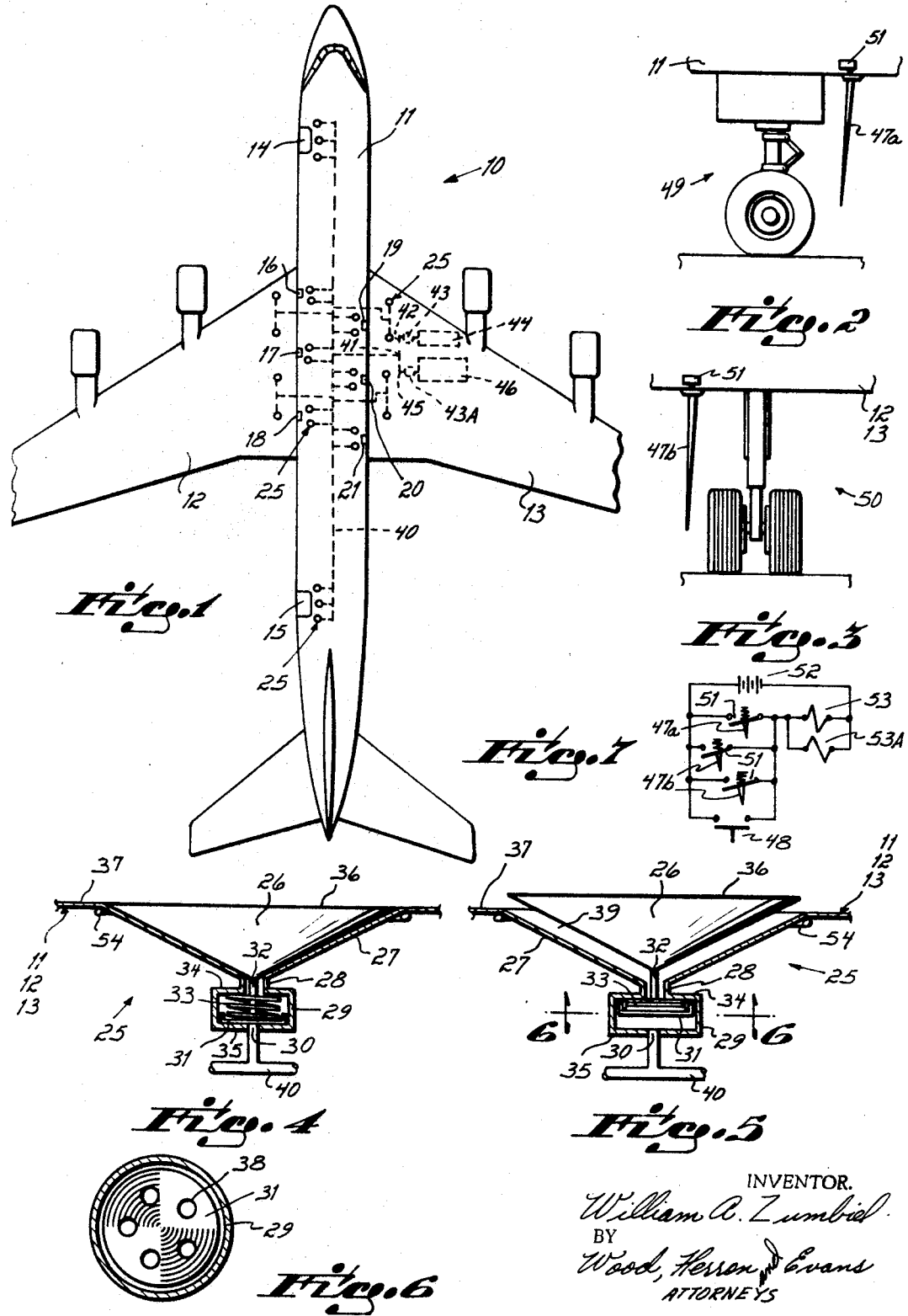
INVENTOR.
William A. Zumbiel
BY
Wood, Herron & Evans
ATTORNEYS July 23, 1968  W. A. ZUMBIEL  3,393,884
AIRCRAFT SAFETY SYSTEM Filed May 5, 1967  2 Sheets-Sheet 2

INVENTOR.
William A. Zumbiel
BY
Wood, Herron & Evans
ATTORNEYS

United States Patent Office 3,393,884
Patented July 23, 1968

3,393,884
AIRCRAFT SAFETY SYSTEM
William A. Zumbiel, 85 Dudley Road,
South Fort Mitchell, Ky. 41017
Filed May 5, 1967, Ser. No. 636,499
13 Claims. (Cl. 244—129)

ABSTRACT OF THE DISCLOSURE

A safety system for delaying and retarding the spread of fire around the exits of an aircraft. The system includes a fire extinguishing system mounted upon the aircraft and operable automatically in response to a crash to open normally closed dispensing valves and spread a high density fire extinguishing foam over the aircraft exits.

Background of the invention

With the advent of greater numbers and larger sizes of aircraft, casualty lists resulting from plane crashes are increasing in both frequency and length. Many of these disasters are the result of plane crashes which occur during land or take off. Such crashes do not usually destroy the aircraft upon impact, but do often result in all passengers being burned to death in the resulting fires.

The invention of this application is not intended to prevent or eliminate fires resulting from plane crashes but only to hold back the fire around the doors and emergency exits for a few minutes after a crash so as to give the passengers time to escape before the plane is completely engulfed in flames.

Prior art

Previous attempts to control aircraft fires have always involved either fire extinguishing equipment mounted on portable trucks at the airport or fire extinguishing equipment mounted upon the plane for automatically extinguishing a fire in the interior of the plane. Inevitably, both systems usually fail because crash trucks arrive too late at the scene of an aircraft fire to enable the passengers to escape and the resulting fire on the exterior of the plane cannot be subdued by a fire extinguishing system which dispenses the fire extinguishing liquid or foam on the interior of the plane.

Summary of the invention

Rather than trying to completely extinguish the fire on the exterior of a plane, the invention of this application only retards or extinguishes the fire on the exterior of the plane in the vicinity of the door and emergency exits. To this end, the safety system of this application comprises a series of normally closed dispensing valves located on the exterior of the plane in the vicinity of the doors and exits through which high density fire extinguishing foam is dispensed automatically in response to a crash of the aircraft. The system comprises a series of pressure actuated feelers operable to detect contact of the fuselage of the plane with the ground and open the dispensing valves automatically in response to such contact so that a blanket of fire extinguishing foam is then dispensed over the exits. This blanket is sufficient to prevent a wall of flames from blocking the exits for a few minutes so that the passengers may escape through the exits.

These and other objectives and advantages of this invention will be more readily apparent from the following description of the drawings in which:

FIGURE 1 is a top plan view of a jet aircraft diagrammatically illustrating the safety system of this invention as applied to said aircraft.

FIGURE 2 is a side elevational view of the landing gear at the nose section of the aircraft of FIGURE 1 illustrating the location of a feeler element for activating the device of this application.

FIGURE 3 is a front elevational view of one of the main landing gears of the aircraft illustrating the location of another feeler element for activating the safety system of this application.

FIGURE 4 is a cross-sectional view, partially in elevation, of an exit valve of the safety system, the valve being illustrated in a closed condition.

FIGURE 5 is a view similar to FIGURE 4, but illustrating the exit valve in an open or dispensing condition.

FIGURE 6 is a cross-sectional view taken along line 6—6 of FIGURE 5.

FIGURE 7 is an electrical circuit diagram of the control circuit for activating the safety system.

Figure 8:
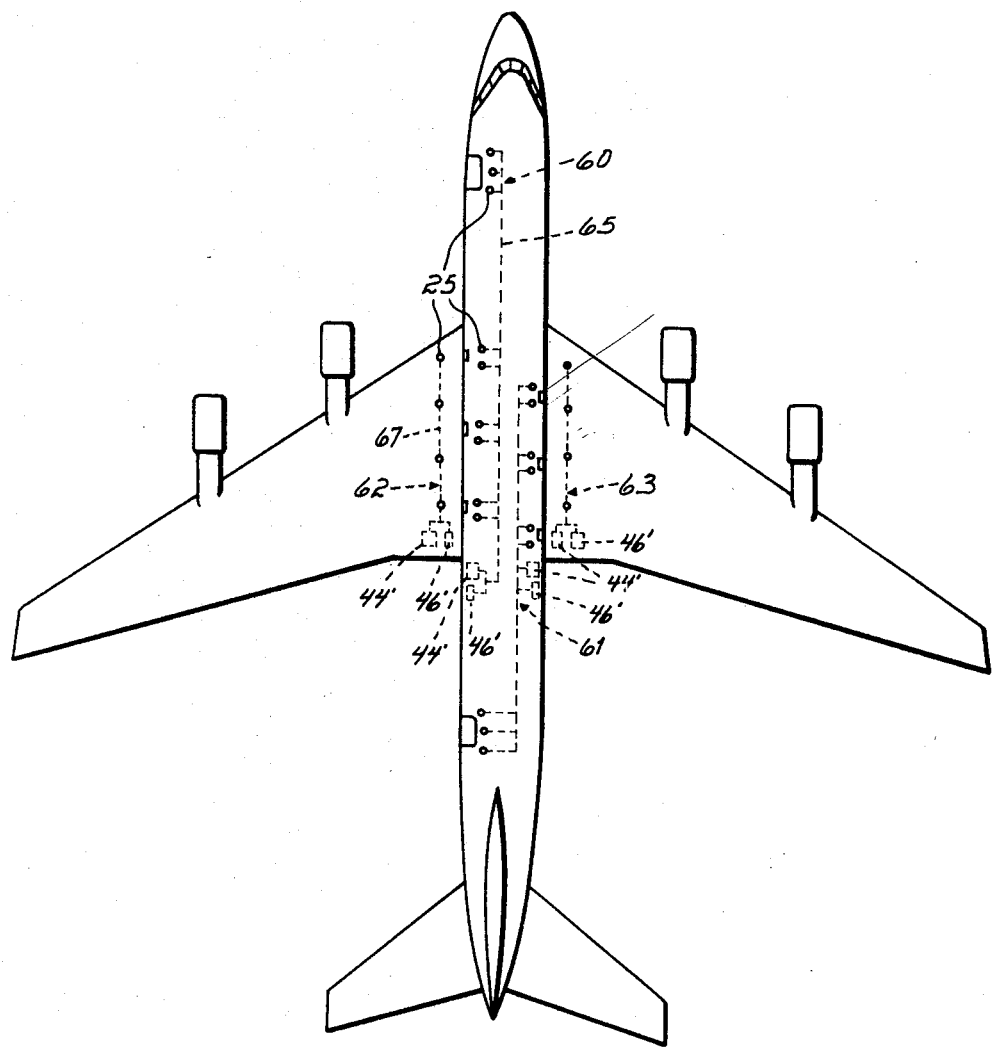
FIGURE 8 is a top plan view of a jet aircraft diagrammatically illustrating a second embodiment of the safety system of this invention.

Referring first to FIGURE 1, there is illustrated a conventional aircraft 10 having a fuselage 11 and wings 12, 13. The fuselage 11 has conventional front and rear passenger doors 14, 15 and conventional emergency exits 16–21.

The safety system of this invention serves to retard the spread of fire and to prevent smoke and flames from blocking the aircraft exits in the event of a fire while the aircraft is on the ground. To this end, the system includes fire extinguishing material dispensing valves or nozzles 25 located in the fuselage 11 directly above the doors 14, 15 and around each of the emergency exits 16–21. The valves 25 around the emergency exits 16–21 may be located above the exits in the fuselage 11 and below the exits in the top surface of the wings 12 and 13.

All of the dispensing valves 25 are identical and therefore only one has been illustrated in detail. As may be seen most clearly in FIGURES 4, 5 and 6, each dispensing valve or nozzle 25 comprises a solid conically shaped closure plug or gate 26 that is snugly received in a mating or conical recess 27 of the fuselage or wings as the case may be. The bottom of the recess 27 has an aperture or throat 28 which opens into the top of a cylindrical chamber 29. This chamber has an inlet port 30 at its bottom which connects the chamber 29 to a source of fire extinguishing foam, as is explained more fully hereinafter.

An annular port plate 31 is attached to the bottom of a depending stem 32 of the plug 26 and is slidable within the cylindrical chamber 29. A compression spring 33 surrounds the stem 32 and is sandwiched between the upper wall 34 of the cylindrical chamber 29 and the port plate 31. This spring 33 biases the port plate 31 downwardly against the bottom wall 35 and blocks the inlet port 30. When the port plate is in the lower or closed position, the outside surface 36 of the plug 26 is flush with the exterior surface 37 of the fuselage or wing.

As may be seen in FIGURES 5 and 6, the dispensing valves 25 are opened by forcing the port plates 31 upwardly against the bias of the springs 33. This results in the inlet ports 30 and the lower side of the chambers 29 being opened to atmosphere via circular holes 38 in the plate 31 and through an annular slit 39 formed between the plug 26 and recess 27.

The port 30 of each of the dispensing valves 25 is connected via conventional flexible tubing 40 to the outlet of a combination mixing chamber and T joint 41. One inlet line or branch 42 of the mixing chamber 41 is connected through a solenoid activated valve 43 to a tank 44 which contains a commercially available high density foam activating chemical. The other inlet line or branch 45 of the mixing chamber 41 is similarly connected through another solenoid operated valve 43A to a tank 46 which contains a commerically available fire extinguishing chemical.

Preferably, an electric heating element 54 is mounted in the aircraft fuselage or wing at a location surrounding the periphery of each of the dispensing valve mounting recesses 27. These heating elements prevent the collection and freezing of moisture between the valve plugs and the valve recesses so that the dispensing valves cannot freeze shut.

*Operation*

The safety system of this invention is designed for emergency use only and, accordingly, is designed to be actuated either by feeler rods 47 attached to the bottom of the aircraft or by an emergency exit button 48 in the aircraft cockpit. Preferably, there are three feeler rods 47a, 47b, one 47a located adjacent the nose landing gear 49 and two others 47b located adjacent each of the wing landing gears 50 of the aircraft. Each of these rods 47a, 47b is operable upon contact with the ground to close an electrical switch 51. The rods 47 normally reside above ground level and collapse to close the switches 48 only if the aircraft crash lands with the landing gear retracted or if one of the landing gears collapse. As may be seen in FIGURE 7, collapsing of one of the rods 47a, 47b closes one of the switches 51 to complete a circuit from an auxiliary battery 52 to the two solenoids 53, 53a of valves 43, 43a. Actuation of these solenoids results in opening of the valves 43, 43a so that the ingredients contained within the tanks 44, 46 combine in the mixing chamber 41 to create a conventional fire preventative or fire extinguishing foam. The chemical reaction in the mixing chamber also results in a pressure increase which causes the expanding foam to be forced through the lines 40 to the ports 30 of the dispensing valve 25. The pressure exerted by the foam forces the port plates 31 upwardly to compress the springs 33 so that the foam may pass through the port 30, the ports 38 of plate 31, and slit 39 to the atmosphere.

As may be seen in FIGURE 7, the solenoids 53, 53a of valves 43, 43a may also be energized by the push button 48 located inside the aircraft cabin. This button is intended to be actuated only in the event of a ground fire in or on the aircraft.

The dispensing valves 25 are located at the exits of the aircraft and positioned such that the fire extinguishing foam issuing from the valves 25 provides a protective shield for passengers making their exodus from the aircraft. This shield is not intended to completely extinguish an aircraft fire but only to hold the fire back from the exits for a few minutes so that the chances are improved for the entrapped passengers to escape.

Referring now to FIGURE 8, there is illustrated a second embodiment of the aircraft safety system. This system is generally similar to that illustrated in FIGURES 1 through 7, but differs in that it comprises four independently operable systems 60, 61, 62 and 63 on a single aircraft. The first system 60 comprises a plurality of exit valves 25 (identical to the exit valves of FIGURES 4 and 5) located over the doors and emegency exits on the left side of the aircraft fuselage as viewed in FIGURE 8. These valves 25 are supplied with high density fire extinguishing foam from the storage tanks 44', 46' via a network of conduits 65. The tanks 44', 46' are identical to the tanks 44, 46 of the safety system illustrated in FIGURE 1 and are connected through similar solenoid operated flow control valves (not shown in FIG. 8) which control the flow of fire extinguishing foam through the conduits 65.

The second safety system 61 is identical to the first system 60 except that it is positioned to supply fire extinguishing foam to the doors and exits on the right side of the aircraft fuselage as viewed in FIGURE 8. Similarly, the independently operable systems 62, 63 comprise a pair of tanks 44', 46' connected to exit valves 25 on the aircraft wings by conduit networks 65. Both systems 62, 63 include flow control valves (not shown) operable to control the flow of fire extinguishing foam through the conduits 67 to the exit valves 25.

All of the flow control valves of the safety systems 60, 61, 62 and 63 of FIGURE 8 are solenoid operated valves which are controlled from a single control circuit similar to that illustrated in FIGURE 7. Thus, all of the exit valves 25 of the systems 60, 61, 62 and 63 are simultaneously opened.

The primary advantage of multiple safety systems on a single aircraft as illustrated in FIGURE 8 accrues from the independent operability of the four systems 60, 61, 62, 63. If one wing of the aircraft is torn off in a crash or if the fuselage is broken open so as to part one of the conduits, the other portions of the system are still operable to supply fire extinguishing foam to some of the exits of the aircraft and thereby withhold the spread of fire over the exterior of the plane to those exits. Additionally, the system of FIGURE 8 is advantageous in that it utilizes four small areas for the storage of the tanks 44' and 46' rather than a single large area of the aircraft.

While only two preferred embodiments of my invention have been illustrated and described herein, those skilled in the arts to which this invention pertains will readily appreciate numerous changes and modifications which may be made without departing from the spirit of my invention. Specifically, other actuators or crash detectors, such as inertia triggered detectors, could be utilized to open the valves of this safety system. Therefore, I do not intend to be limited except by the scope of the appended claims.

Having described my invention, I claim:

1. A safety system for use in combination with an aircraft to facilitate emergency evacuation of passengers from the aircraft, said safety system comprising
    at least one storage tank mounted upon said aircraft and having a supply of fire extinguishing material stored in said tank,
    normally closed exit valves recessed into the exterior surface of said aircraft and having outer surfaces flush with the exterior surface of said aircraft, said exit valves being located over the passenger exits of said aircraft,
    conduits interconnecting said tank and said exit valves,
    at least one actuator valve for controlling the flow of fire extinguishing material from said tank to said exit valves, and
    control means responsive to a crash landing of said aircraft to open said actuator valve and all of said exit valves so that the exterior of each of said passenger exits is flooded with said fire extinguishing material.

2. The safety system of claim 1 wherein said system includes means associated with each of said exit valves for preventing said exit valves from accumulating moisture and freezing shut.

3. The safety system of claim 1 wherein said control means includes a pressure responsive feeler element operable to detect contact of the fuselage of said aircraft with the ground and actuate an electrical control circuit for opening said actuator valve.

4. The safety system of claim 1 wherein said system includes a pair of storage tanks for storing the chemical components of a fire extinguishing foam in separate tanks, said system further including a pair of actuator valves for preventing the mixture of said components until both of said valves are opened.

5. The safety system of claim 1 wherein each of said exit valves is held in the closed condition by a spring and is opened against the bias of said spring by the pressure of fire extinguishing material acting upon said valve.

6. A safety system for use in combination with an aircraft to facilitate emergency evacuation of passengers from the aircraft, said safety system comprising
    at least one storage tank mounted upon said aircraft and having a supply of fire extinguishing material stored in said tank, normally closed exit valves recessed into the exterior surface of said aircraft and having outer surfaces flush with the exterior surface of said aircraft, said exit valves being located over the passenger exits of said aircraft, conduits interconnecting said tank and said exit valves, and control means responsive to a crash landing of said aircraft to open all of said exit valves so that the exterior of each of said passenger exits is flooded with said fire extinguishing material.

7. The safety system of claim 6 which further includes an actuator valve located adjacent said tanks to prevent said fire extinguishing material from entering said conduits until said actuator valve is opened in response to a crash landing of said aircraft.

8. The safety system of claim 7 wherein said fire extinguishing material is stored in two different tanks each having an actuator valve and said material is mixed only upon opening of said actuator valves.

9. The safety system of claim 8 wherein said control means includes at least one pressure responsive feeler element operable to detect contact of the fuselage of said aircraft with the ground and actuate an electrical control circuit for opening said actuator valve.

10. The safety system of claim 8 wherein said control means includes a pressure responsive feeler element operable to contact the ground upon collapse of the landing gear of the aircraft and actuate an electrical control circuit for operating said actuator valve in response to said ground contact.

11. The safety system of claim 10 wherein each of said exit valves is forced into the open position by the pressure of the fire extinguishing material acting upon said exit valves.

12. The safety system of claim 11 wherein each of said exit valves is held in the closed position by a compression spring.

13. For use in combination with an aircraft to facilitate emergency evacuation of passengers from the aircraft, a plurality of independently operable safety systems, each of said systems comprising at least one storage tank mounted upon said aircraft and having a supply of fire extinguishing material stored in said tank, normally closed exit valves recessed into the exterior surface of said aircraft and having outer surfaces flush with the exterior surface of said aircraft, said exit valves being located over the passenger exits of said aircraft, conduits interconnecting said tank and said exit valves, at least one actuator valve for controlling the flow of fire extinguishing material from said tank to said exit valves, and control means responsive to a crash landing of said aircraft to open the actuator valves of each of said systems and all of said exit valves so that the exterior of each of said passenger exits is flooded with said fire extinguishing material.

References Cited

UNITED STATES PATENTS

| | | | |
|---|---|---|---|
| 2,353,765 | 7/1944 | Mathisen | 169—2 |
| 2,393,328 | 1/1946 | Mahone | 239—506 |
| 2,419,826 | 4/1947 | Dodelin et al. | 222—5 |

FOREIGN PATENTS

| | | |
|---|---|---|
| 527,683 | 7/1956 | Canada. |
| 1,040,030 | 5/1953 | France. |

MILTON BUCHLER, *Primary Examiner.*

J. PITTENGER, *Assistant Examiner.*